United States Patent [19]

Abe et al.

[11] Patent Number: 4,698,774

[45] Date of Patent: Oct. 6, 1987

[54] METHOD OF AND APPARATUS FOR CONTROLLING AUTOMATIC SOLDERING SYSTEM

[75] Inventors: Nobuhide Abe, Iruma; Minoru Adachi, Niiza; Makoto Ito, Hoya; Toshiya Uchida, Tokyo, all of Japan

[73] Assignee: Kabushiki Kaisha Tamura Seisakusho, Tokyo, Japan

[21] Appl. No.: 781,351

[22] Filed: Sep. 27, 1985

[30] Foreign Application Priority Data

Oct. 2, 1984 [JP] Japan .................. 59-206813

[51] Int. Cl.$^4$ ............... G06F 15/46; B23K 31/02
[52] U.S. Cl. .................. 364/477; 219/85 BA; 219/388; 228/9; 228/180.1; 228/43
[58] Field of Search ................ 364/468, 477; 228/7–12, 36, 37, 43, 57, 179, 180.1, 180.2, 102, 257, 260, 232; 219/388, 137.2, 79, 85 R, 85 H, 85 BA, 85 BM

[56] References Cited

U.S. PATENT DOCUMENTS

| | | | |
|---|---|---|---|
| 3,868,648 | 2/1975 | Levin | 364/468 X |
| 4,180,199 | 12/1979 | O'Rourke et al. | 228/9 X |
| 4,363,434 | 12/1982 | Flury | 228/37 X |
| 4,373,657 | 2/1983 | Fillon | 219/137.2 X |
| 4,401,253 | 8/1983 | O'Rourke | 228/37 X |
| 4,446,358 | 5/1984 | Comerford et al. | 219/388 |
| 4,583,674 | 4/1986 | Dines et al. | 228/10 X |
| 4,595,816 | 6/1986 | Hall et al. | 219/85 BA X |

Primary Examiner—Joseph Ruggiero
Attorney, Agent, or Firm—James E. Nilles; Thomas F. Kirby

[57] ABSTRACT

A method of and apparatus for controlling automatic soldering system in which respective units of the automatic soldering system are controlled preparatorily to reduce the waiting time until main driving to zero. In the soldering driving time, the temperature of the work itself is precisely controlled to the predetermined value by means of directly measuring the temperature of the work and controlling the preheater to bring the soldering characteristic in the next soldering step into the most optimal value in compliance with the size and the like of the work to be soldered.

11 Claims, 20 Drawing Figures

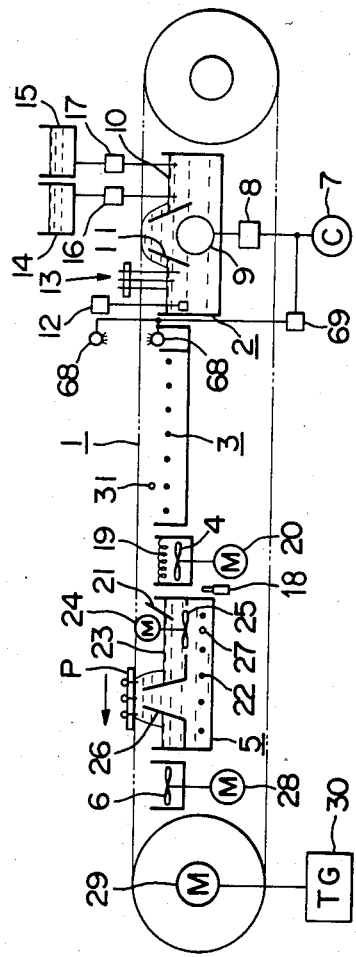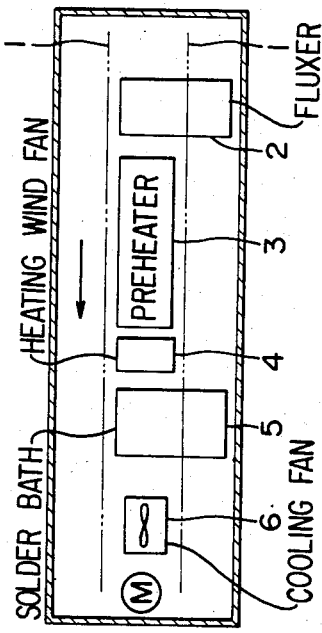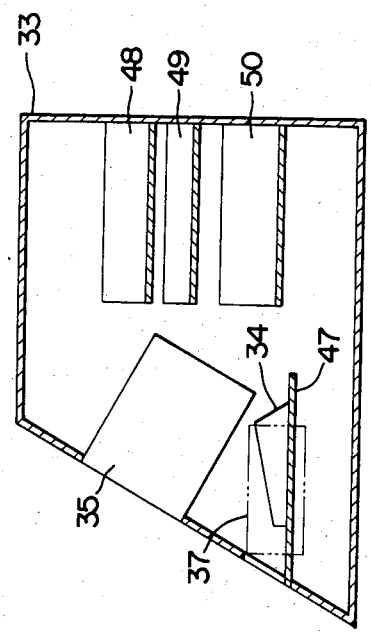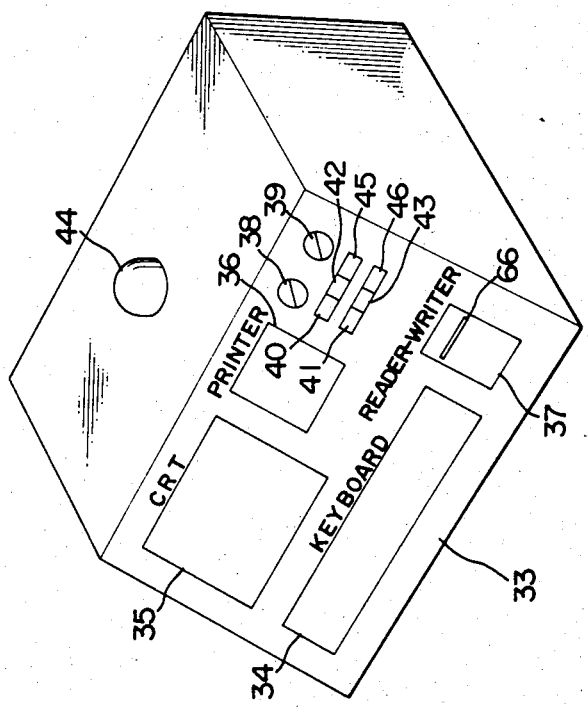

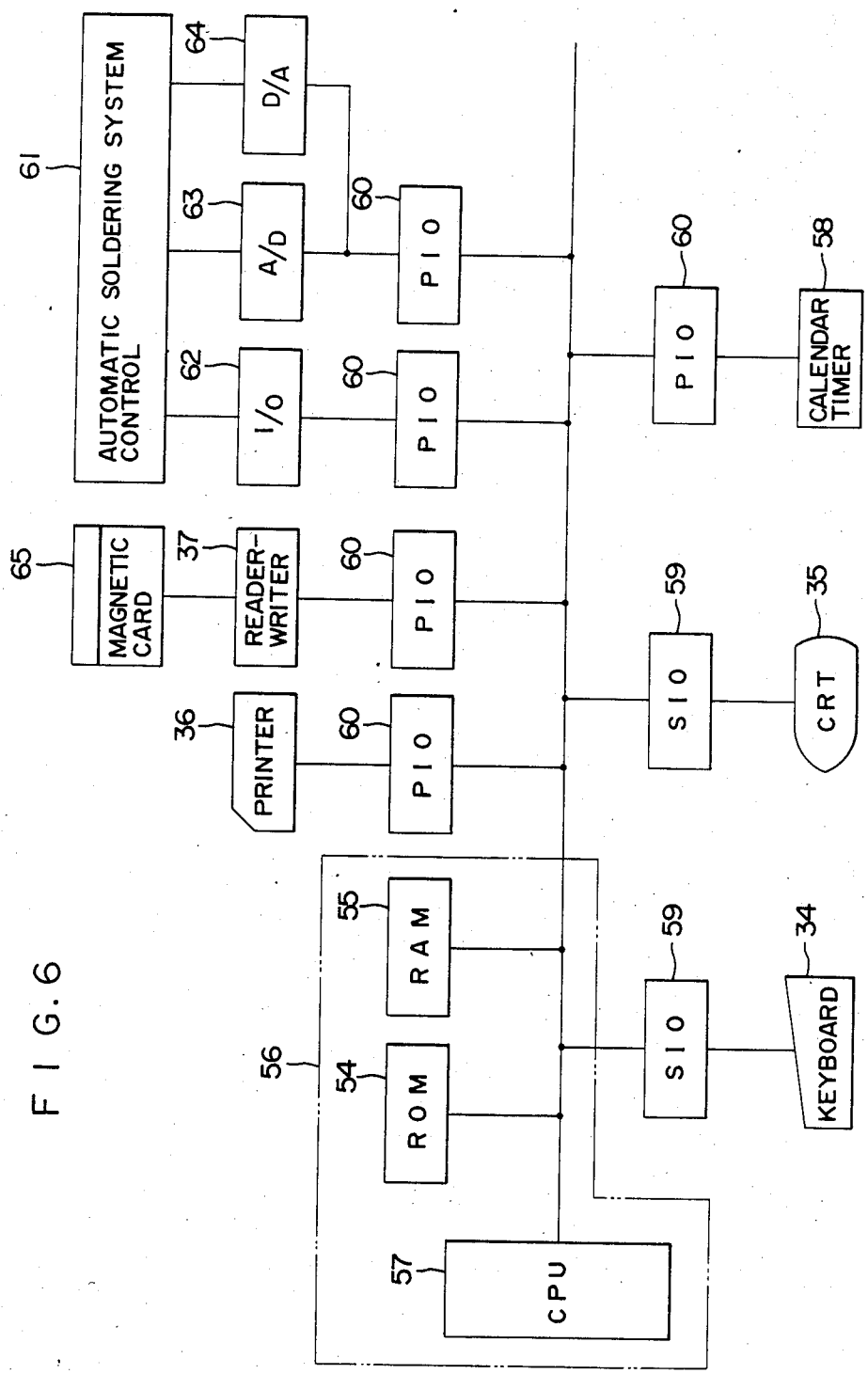

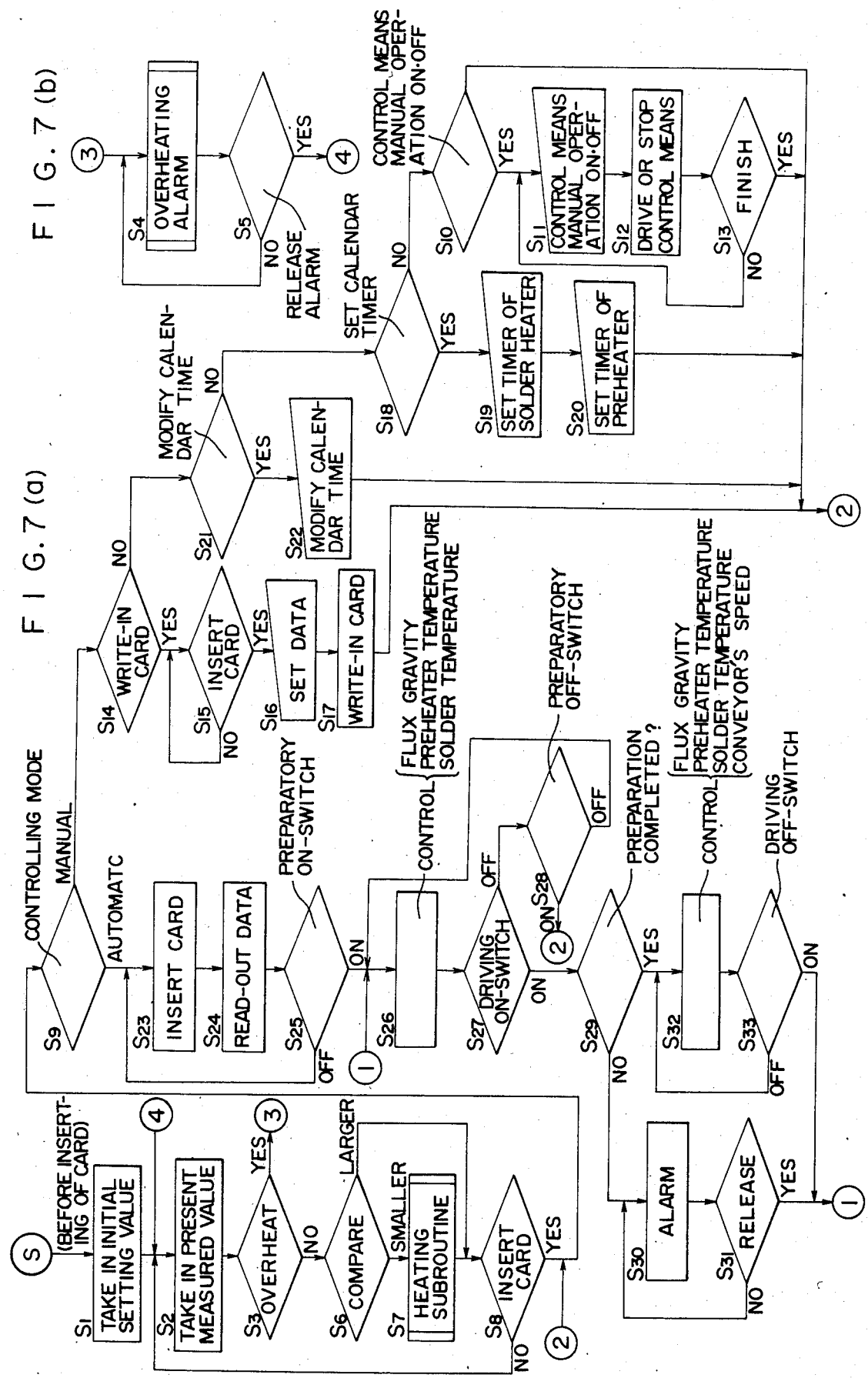

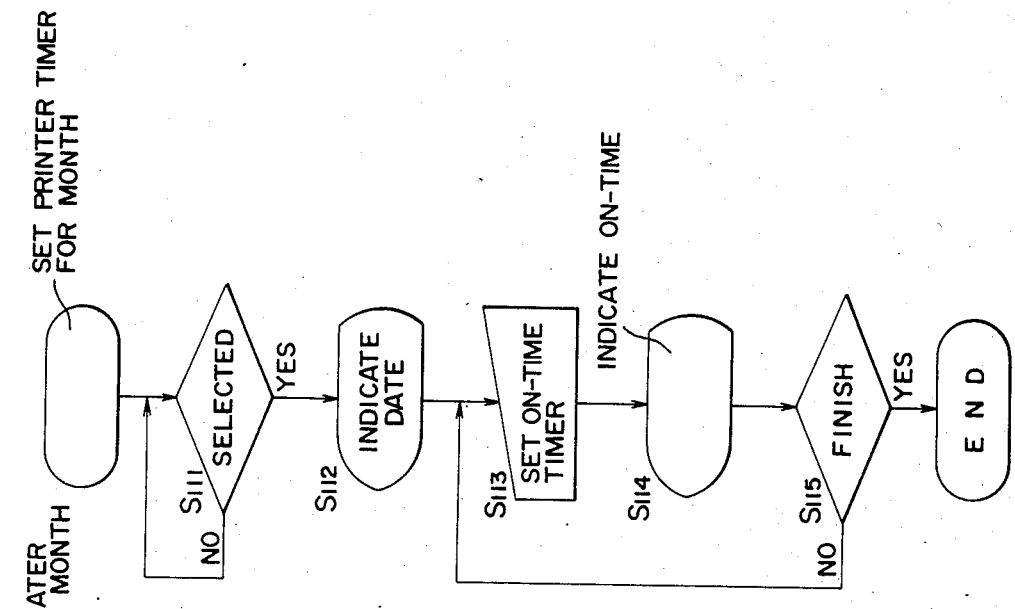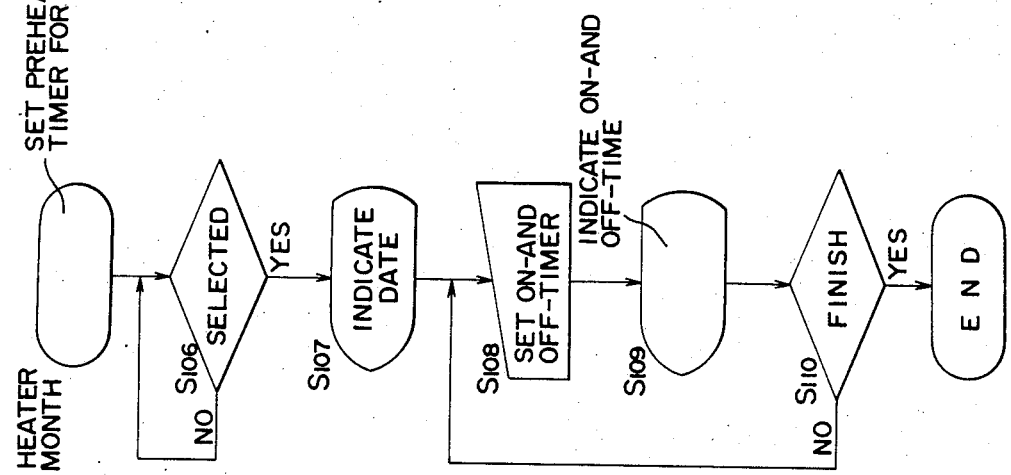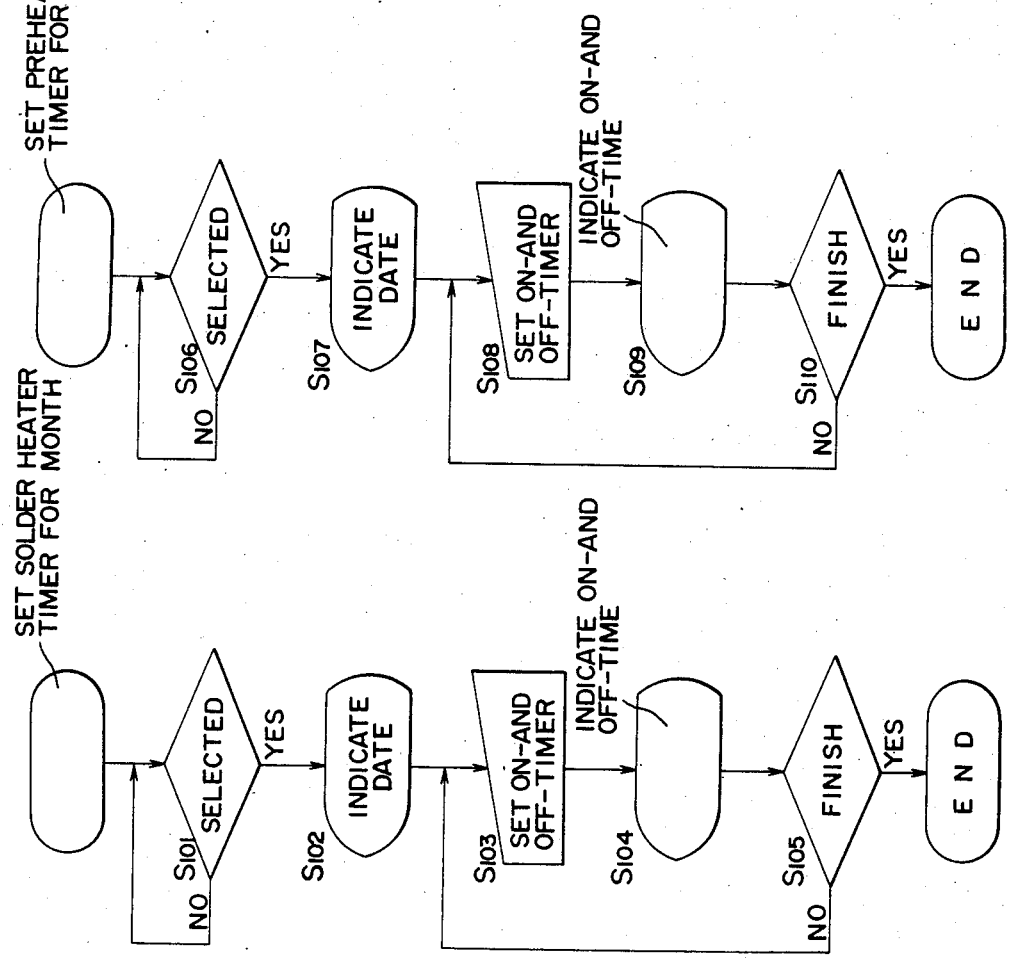

METHOD OF AND APPARATUS FOR CONTROLLING AUTOMATIC SOLDERING SYSTEM

BACKGROUND OF THE INVENTION

1. Field of the Invention

The present invention relates to a method of and apparatus for controlling an automatic soldering system.

2. Description of the Prior Art

Automatic soldering systems are generally comprised so as to solder various kinds of printed circuit boards.

Conventionally, prior to supplying the same automatic soldering system with printed circuit boards whose size, mounting part density and the like are different from one another, it has been necessary to arrange working conditions of respective controlling means in automatic soldering systems so as to comply with respective printed circuit boards. For example, if the size of the printed circuit board to be soldered is changed, it is necessary to arrange for each printed circuit board the factors such as gravity of flux in a fluxer, heating temperature with a preheater, dissolved solder in a solder bath, velocity of transporting conveyor for printed boards and the like.

However, there are many kinds of printed circuit boards. Thus, it is necessary to optimally arrange respective controlling means in the automatic soldering system so as to comply with each printed circuit board. Accordingly, the arrangement is very complicated and it has thus been impossible to accomplish fine control in accordance with the difference between each printed circuit board.

SUMMARY OF THE INVENTION

It is a main object of the present invention to provide respective units of the automatic soldering system with optimal centralized control.

Further, the prior art systems are designed so as to proceed in the following steps; the timer starts running at a time predetermined by counting back from the working time, the soldering heater is energized, the preheater is initially energized and, when the working time begins, the main driving (soldering driving) can be started by turning on a driving on-switch on.

However, factors such as the preheating temperature, soldering temperature and the like vary slightly with the size and the density of parts to be mounted on the printed board to be soldered. Thus, the conventional uniform preparatory driving time cannot conform to the change of the size of the printed circuit board. As a result, when the main driving starts, said factors such as the preheating temperature, the soldering temperature and the like often do not match the driving conditions which are suitable for each kind of printed circuit board. Furthermore, it is, in practice, impossible to arrange the preparatory driving time prior to the working so as to comply with each printed circuit board. Thus, unproductive waiting time is often spent in the interval from starting time to the main driving stage.

Accordingly, it is a further object of the present invention to reduce the waiting time until main driving commences to zero by carrying out preparatory driving to directly accomplish the optimal main driving to conform to the work to be soldered.

Moreover, with respect to soldering in prior art systems, in case of controlling a preheater for preheating a work to be soldered (printed board), a measuring means, such as a thermocouple or the like provided nearby this preheater, serve to measure the atmospheric temperature of the preheater and the preheater is switched on and off so as to make this atmospheric temperature the predetermined value.

However, the temperature of the printed circuit board to be heated does not necessarily have a fixed relation to the atmospheric temperature because of the difference of printed circuit board size and density of mounted parts in relation to this board, and the like. Accordinly, it is difficult to precisely predict the temperature of the printed circuit board to be heated from the temperature on the side of the preheater. As a result, conventionally, it has been impossible to control the temperature of a printed board precisely.

Accordingly, it is a further object of the present invention to change the object to measure the temperature so as to comply with the preparatory driving time or the soldering driving time, in the soldering driving time, to precisely control the heating of the work itself to approximate the temperature to the predetermined value by means of directly measuring the temperature of the work and controlling the preheater, and to bring the soldering characteristic in the next soldering step into the most optimal value in compliance with the size and the like of the work to be soldered.

Further, in general, automatic soldering systems are designed to accomplish soldering on the work to be soldered by transporting it along a fluxer, a preheater and a solder bath by means of a conveyor.

When operating a soldering system like this, the conventional system is designed to have the following steps, wherein the timer starts at the time predetermined by counting back from the working time, the soldering heater is energized, then the preheater is energized and, at the working time, the main driving (soldering driving) can be started by turning on a driving switch.

However, factors such as the preheater temperature and the soldering temperature differ slightly because of the differences in size and density of mounted parts on a printed circuit board. Thus, the conventional uniform preparatory driving time cannot conform to the change of size of a printed circuit board. As a result, when starting main driving, said factors such as the preheater temperature, the soldering temperature and the like do not often achieve driving conditions which are appropriate for each kind of printed board. Further, it is, in practice, impossible to arrange preparatory driving time prior to working to conform to each kind of printed board. Accordingly, unproductive waiting time is often spent from the working time to the main driving stage.

Consequently, it is another object of the present invention to accomplish the preparatory driving so as to immediately carry out the optimal main driving for the work to be soldered on the basis of the data read out from a host computer to conform with said work.

These and other objects and features of the present invention will be described, hereinafter, in connection with the drawings.

BRIEF DESCRIPTION OF THE DRAWINGS

The drawings show one embodiment of the present invention.

FIG. 2 is a plan view schematically showing a soldering system.

FIG. 3 is a sectional view of FIG. 2.

FIG. 4 is a perspective view of the control-operating section of the system.

FIG. 5 is a sectional view of the control-operating section thereof.

FIG. 6 is a block diagram showing the hardware arrangement of the system-controlling system.

FIGS. 7 (a) and 7(b) are flow charts showing the program of the overall system.

FIGS. 15, 16 and 17 are flow charts showing set programs of a calendar timer.

DESCRIPTION OF THE PREFERRED EMBODIMENTS

Figure 1:
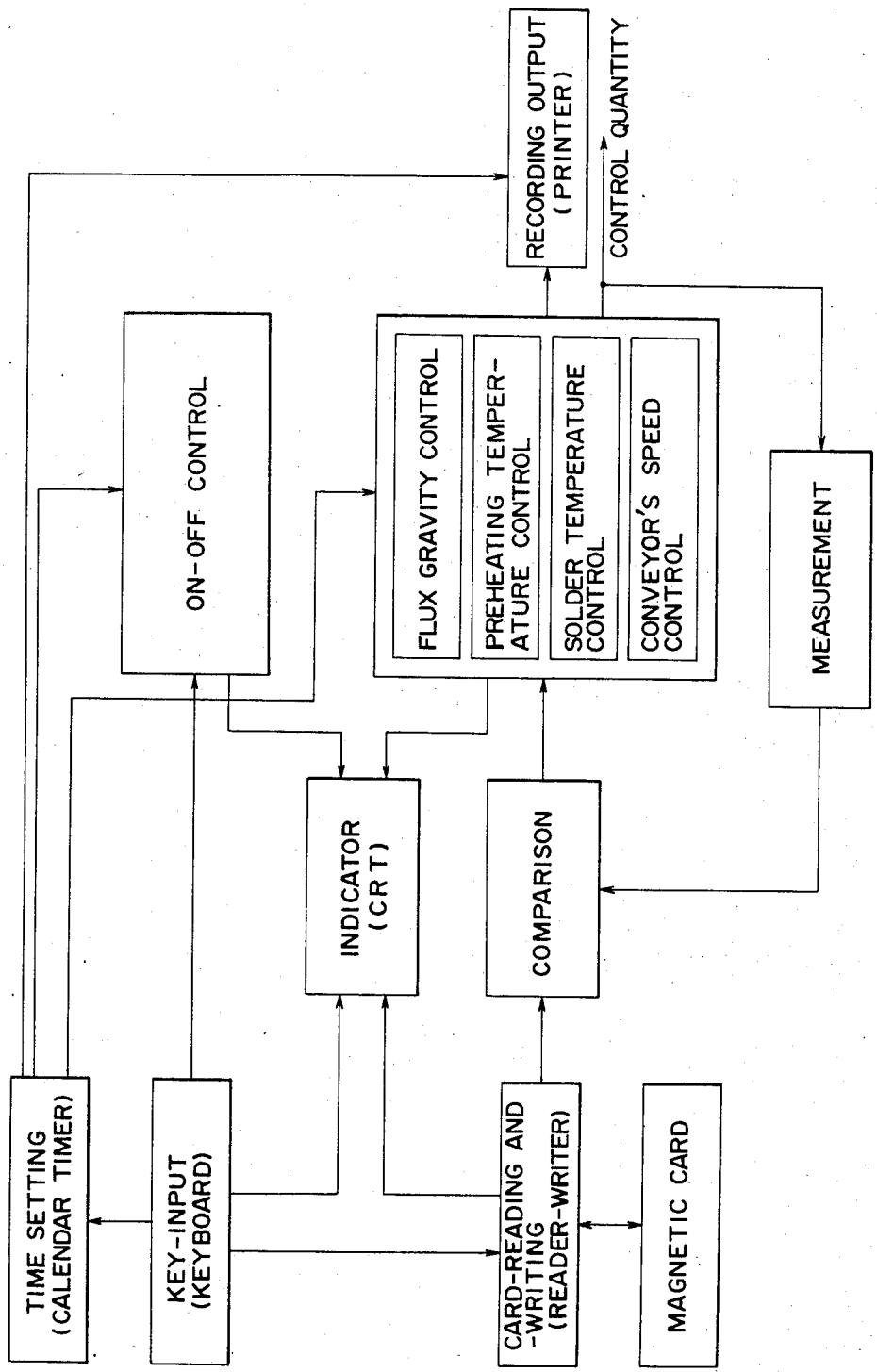
FIG. 1 is a block diagram showing the arrangement of the present invention.

FIG. 1 is a block diagram schematically showing a soldering-system-controlling system for controlling each unit of the automatic soldering system by means of one magnetic card. This controlling system is comprised of a magnetic card memorizing at least flux gravity setting value, a preheating temperature setting value, a solder temperature setting value and a working conveyor's speed setting value, card-reading-and-writing means for reading out and writing in said setting values in relation to this magnetic card, flux gravity control means and preheating temperature control means and solder temperature control means and working conveyor speed control means in the automatic soldering system controlled on the basis of respective setting values read-out by said reading-and-writing means, measuring means for measuring the amount of control of each of said controlling means, comparing means for comparing a measured value with said measuring means with a setting value of said magnetic card and imparting a control input to respective control means, key-input means for writing respective setting values on said magetnic card through said reading-and-writing means, on-and-off type control means for accomplishing an on-and-off operation by this key-input means, indicating means for indicating working conditions of said key-input means, reading-writing means and respective control means, time setting means for controlling a long-periodical program in relation to said respective control means by means of the setting time set by said keyboard input means and recording and output means for periodically and automatically recording working conditions of respective control means in accordance with the instruction of said time setting means.

The response system between said keyboard input means and said display means serves to realize the setting of working conditions, the indication of working circumstances, the instruction of the operating process and the like of respective control means in the automatic soldering system. And the key-input means serves to carry out the on-and-off operation of the control means and, by means of card-reading-and-writing means, to write down on the magnetic cards the working conditions of such as at least the flux gravity control means, the preheating temperature controlling means, the solder temperature controlling means and working conveyor speed control means. Respective control means of said soldering system are operated on the basis of the setting values written on this magnetic card. The amount of control output from said respective control means is detected and is fed back to the comparing means for comparing the setting value therewith. As a result, respective control means are controlled to maintain respective setting values within narrow limits. Further, the time setting means serves to control the respective controlling means in accordance with the program set over a long period and simultaneously to periodically give the instructions to the recording output means for recording the measured values of the respective controlling means. The data of the measured values is used as a reference for maintaining and controlling the automatic soldering system.

FIG. 2 shows the soldering system schematically, wherein there are disposed a fluxer 2, a preheater 3, a heating wind fan 4, a solder bath 5 and a cooling fan 6 along a chain conveyor 1 transporting a printed board as a work to be soldered.

In FIG. 3, said fluxer 2 serves to intermittently fire a flux 10 when it detects a printed board P by means of the air supplied from a compressor 7 to a firing cylinder 9 through an on-and-off electromagnetic valve 8, that is, a firing nozzle 11 injects the flux so as to coat the lower surface of the printed board P with said flux. In the flux, there are inserted a hydrometer 12, which is a means of measuring the flux gravity, and a liquid-level indicator 13, and also connected an undiluted solution tank 14 and a diluted solution tank 15 through electromagnetic valves 16 and 17, which are means for controlling the flux gravity. In addition, it is possible to employ pressure as a way of supplying the undiluted solution and the diluted solution by forcing them through electromagnetic valves 16 and 17 by means of air pressure from a floor tank. Said preheater 3, which is a means of controlling the preheating temperature, is proportionally-controlled so as to detect its heating temperature by means of the preheating temperature measuring means comprised of a Chromel-Alumel thermocouple 31 to measure the atmospheric temperature of this heater and an infrared radiation thermometer 18 to measure the lower surface, the surface to be soldered, of the printed board heated by this preheater 3 without touching the surface. Said heating wind fan 4 is turned on and off by a heater 19 and a fan motor 20. A nozzle 26 of said solder bath 5 serves to intermittently eject melted solder 23 at 250° C. heated by at first, a dissolution heater 21 and, when working, a control heater 22 functioning as a solder temperature controlling means, linked with detection of the printed board P by means of a pump 25 driven by a motor 24, for the purpose of soldering on the lower surface of the printed board P. The temperature of the melted solder is detected by a thermocouple 27 functioning as a solder temperature measuring means so as to be proportional-differential-integral-controlled. Said cooling fan 6 is turned on and off by a motor 28. Said conveyor is driven by a ring cone motor 29 capable of controlling its speed, which functions as the conveyor's speed controlling means, and the conveyor's speed is simultaneously detected by a tachometer generator 30, hereafter, referred to as a TG, functioning as a means for measuring the conveyor's speed.

FIG. 4 shows the operating section for controlling said soldering system. The operating section includes, in its body case 33, a built in keyboard (console) 34 functioning as a key-input means, a cathode-ray tube display, hereafter referred to as a CRT 35, functioning as an indicating means, a printer 36 functioning as a memorizing and output means, a card-reader-writer 37 functioning as a reading and writing means for a magnetic card, a main switch 38 which has three functions, namely: manually, turn off and timer, a controlling mode switch 39 having automatic or manual positions, a preparation-on switch 40, a preparation-off switch 41, a driving-on switch 42, a driving-off switch 43, an alarm light, 44 commercially described as a Pat light, provided on the upper side of said case 33, a switch 45 for stopping an alarm buzzer (not shown) and a switch 46 for releasing the alarm.

In FIG. 5, the keyboard 34 stored under CRT 35 is moved outside the body of the equipment guided on expansion rails 47 by the operator pressing the CRT slightly. At the back of CRT 35, there are provided a unit 48 such as a central processing unit (CPU), a unit 49 such as a CRT interface and a unit 50 such as a power source.

FIG. 6 is a block diagram showing a hardware arrangement of this system-controlling system, in which a micro-computer 56 is comprised of a read-only memory, hereafter, referred to as a ROM, 54 storing a control program of the micro-computer, a random access memory, hereinafter, referred to as a RAM, 55 used as a data memory for the micro-computer and a central processing unit, hereafter, referred to as a CPU 57, which is connected with said keyboard 34, said CRT 35, said printer 36, said card-reader-writer 37 and a calendar timer 58 functioning as a time-setting means capable of setting an annual time program at a second unit by way of a serial input and output (SIO) 59 and a parallel input and output (PIO) 60 and is simultaneously connected with various kinds of controlling means in the conveyor 1, the fluxer 2, the preheater 3, the solder bath 5, and the fans 4, 6, the whole being referred to as 61, of the automatic soldering system by way of said PIO, an input and output (I/O) 62, an analog digital converter (A/D) 63 and a digital-analog converter (D/A) 64. Further, said CPU 57 is equipped with an ordinary comparator circuit (not shown) functioned as comparing means for comparing a setting value with a measured one.

A magnetic card 65 is inserted into an insertion inlet 66 of said card-reader-writer 37 shown in FIG. 4. On this magnetic card 65, the setting values relating to respective measuring means are written and these setting values are read out therefrom. For example, there are written on the magnetic card setting values such as a flux gravity value of 0.830, an atmospheric temperature of the preheater, hereafter referred to as the preheater temperature, of 150° C., a temperature of the printed board heated by this heater, hereafter referred to as a preheating temperature, of 100° C., a dissolved solder temperature of is 250° C., the conveyor speed of 1.2 m/min, and the like.

A single magnetic card 65, can control the whole soldering system. For example, when said setting values in relation to respective such factors as control means must be changed because of a difference in the size of the printed board P, or the density of concentration of parts to be soldered, this magnetic card 65 must be replaced by another.

Then, in the fluxer 2, the measured value of the flux gravity measuring means, consisting of the hydrometer 12 and the liquid-level indicator 13, is A/D converted so as to be applied to the CPU, where the measured value is compared with the setting value of the magnetic card 65, and the on-off instruction made on the basis of the difference between the setting value and the measured value is applied from the CPU to the electromagnetic valves 16 and 17 functioning as flux gravity controlling means through the I/O.

In the preheater 3, the measured value of the preheating temperature measuring means consisting of the thermocouple 31 and the infrared radiation thermometer 18 is A/D converted so as to be input to the CPU, where the measured value is compared with the setting value of the magnetic card 65 and the proportional-differential-integral-control instruction made on the basis of the difference between the setting value and the measured value is applied from the CPU to the preheater 3 functioning as a preheating temperature controlling means through the I/O.

In the solder bath 5, the measured value of the solder temperature measuring means consisting of the thermocouple 27 is A/D converted so as to be input to the CPU, where the measured value is compared with the setting value of the magnetic card 65 and the proportional-differential-integral-control instructions made on the basis of the difference between the measured value and the setting value, and is applied from the CPU to the control heater 22 functioning as a solder temperature controlling means through the I/O. As a result, the solder temperature is maintained at 250° C. Further, the dissolution heater 21 is controlled to be off when the solder temperature is made to be 200° C. in accordance with the initial setting value written in the ROM 54.

In the conveyor 1, the measured value of the conveyor's speed measuring means consisting of the TG 30 is A/D converted so as to be input to the CPU, where this measured value is compared with the setting value and the auto-rater control instruction made on the basis of the difference between the setting value and the measured value is applied from the CPU to the ring cone motor 29 functioning as the conveyor's speed control means through the D/A conversion.

Furthermore, when the printed board P above each unit such as the fluxer or the solder bath is detected by a switch, not shown, the electromagnetic valve 8 on an air supply line to the firing cylinder 9 of the fluxer 2 is controlled from the closed state to the open state and the nozzle 11 serves to fire the flux intermittently. Further, by opening an electromagnetic valve 69, compressed air is supplied from said compressor 7 to upper and lower air knives provided next to the fluxer 2 so as to remove the surplus flux by blowing air on the printed board P intermittently. Further, the rotation of a pump motor 24 of the solder bath is controlled so as to immediately change from low speed to high speed so that the peak value of the melted solder ejected from the nozzle 26 is switched from low level to high level intermittently. These intermittent functions are controlled by the CPU.

Next, the program of the entire system is indicated by a flow chart shown in FIG. 7, in which Sn shows each step in the flow chart.

At a predetermined time early in the morning, for example, 6:30, the dissolution heater 21 and the control heater 22 in the solder bath 5 are initially energized by the calendar timer 58. The first preparatory driving starts, and the program starts (S). Prior to inserting the magnetic card 65, there are following steps; the initial setting value, for example, 20° C., relating to the solder temperature written in the ROM 54 is taken in ($S_1$). Next, the present measured value relating to the solder temperature by means of the thermocouple 27 is taken in ($S_2$). Next, the decision as to whether it is overheated or not is given ($S_3$). If it is overheated, the next step is an overheat-alarm subroutine ($S_4$), the alarm light 44 goes on until the alarm interrupt button 46 is pushed ($S_5$) and the next step returns to $S_2$. If it is not overheated at $S_3$, the measured value is compared with the initial setting value at $S_6$. If the measured value is greater, no need to heat, if it is less, the solder bath 5 is heated by a heating subroutine ($S_7$). If the measured value of the solder temperature is made over the initial setting value (200° C.), the magnetic card 65 can be inserted so that it is determined ($S_8$). If it does not reach the initial setting value, the loop from $S_2$ to $S_8$ is repeated. When, after heating the solder bath 5 to the initial setting value, it is possible to insert the card, and the decision is made to use manual control or an automatic control ($S_9$).

When the manual mode is selected at $S_9$, the CRT 35 displays a manual control menu program: 1. manual control, 2. card setting, 3. timer setting, 4. date and time setting. Thus, by assigning the input job number (1 to 4) and pushing the OK key on the keyboard, which is a return key, the NO key is a space key. The CRT 35 displays the working content which conforms with the job number. For example, if manual control No. 1 is selected, the system goes to $S_{10}$, where on and off control means are indicated such as ①. preheater 3,②. solder motor 24,③. fan motor 28,④. conveyor motor 29,⑤. heating wind fan motor 20 and heater 19, and ⑥ washer (not shown). During maintenance, the above-stated means 1 to 6 can be turned on by pushing the return key (on) and off by pushing the space key (off) ($S_{11}$). Thus, said respective controlling means can be manually worked or stopped ($S_{12}$) and pushing the final key, for example, the M return key, makes the system go back to $S_9$. Otherwise it makes the step go back to the selection of Nos. 1 to 6 and the on-off selection at $S_{11}$ ($S_{13}$). The preheater 3 and the conveyor motor 29 are feedback controlled in the on-state. Further, when No. 2 "card setting" is selected ($S_{14}$), the CRT 35 displays instructions for inserting the magnetic card ($S_{15}$). Then, when the magnetic card 65 has been inserted, the CRT displays the instructions for setting working conditions such as flux gravity (0.830), preheater temperature (150° C.), solder temperature (250° C.) and conveyor speed (1.2 m/min). Thus, for example, the values in the abovestated parentheses are typed by the key ($S_{16}$), said respective setting values are written on the magnetic card 65 by pushing the return key ($S_{17}$) and the system goes back to $S_9$. Further, when No. 3 "timer setting" is selected ($S_{18}$), the CRT displays instructions for setting the calendar timer 58 to the on and off time from Sunday to Saturday for the on-and-off switches of the solder bath controlling heater 22 and the preheater 3. Thus, taking Monday as an example, there are provided for the calendar timer 58 the very accurate time setting such as having the solder control heater 22 turned on at 6:30, off at 17:00, and the preheater 3 turned on at 7:30, off at 10:00, on at 10:15, off at 12:00, on at 13:00, off at 15:00, on at 15:15, and off at 17:00 by input from the keyboard in accordance with the display on the CRT 35 ($S_{19}$, $S_{20}$), and the system is sent back to $S_9$ by pressing the return key. Further, when No. 4 "data and time setting" is selected ($S_{21}$), the modification of the date and time of the calendar timer 58 into the current date and time is accomplished by entries from the keyboard 34 to conform to the display CRT 35 ($S_{22}$), and the system is sent back to $S_9$ by pressing the return key.

When the automatic mode is selected at $S_9$, the CRT display is auto-controlled and simultaneously the CRT displays the present measured value of the solder temperature determined by the thermocouple 27 and the display "Please wait for a while" before the measured value reaches the initial setting value (200° C). When it reaches the initial setting value, the melting heater 21 is turned off and the CRT simultaneously displays "Please insert the card" ($S_{23}$). Then, the magnetic card 65 is inserted into the reader-writer 37. The setting values written in the magnetic card 65 at said steps $S_{14}$ to $S_{17}$ are read out ($S_{24}$) and the system goes to $S_{25}$. If at this $S_{25}$ step, said preparatory on-switch 40 is not pushed, the system goes back to $S_{23}$, in which the setting can be amended by inserting another magnetic card. Pushing the preparatory on-switch 40 causes second preparatory driving to start ($S_{26}$). Preparatory driving is carried out by feedback controlled of flux gravity, preheater temperature and solder temperature so as to bring them to the setting values of the magnetic card 65. The decision as to whether the driving on-switch 42 is to be turned on or not is made ($S_{27}$). If it is not to be turned on, the on or off state of the preparatory off-switch 41 is selected ($S_{28}$). If this off-switch is turned on, the system goes back to $S_9$, in which each operation of the manual mode and the exchange of the magnetic card, amending the setting value, are accomplished. If the preparatory off-switch is turned off, the system goes back to $S_{26}$, so that preparatory driving for flux gravity, preheater temperature and solder temperature continue.

If at step $S_{27}$ the preparatory on-switch is turned on, there a decision is made as to whether said flux gravity, preheater temperature and solder temperature satisfy the corresponding setting values, that is, whether preparation is complete ($S_{29}$). When the present measured values are not nearly same as the setting values of the magnetic card, the alarm is given ($S_{30}$). Pushing the alarm interrupt button 46 sends the system back to $S_{26}$ so that preparatory driving continues, otherwise the alarm light 44 and the alarm buzzer continue to operate ($S_{31}$). If at $S_{29}$ preparation is complete, the main driving (soldering) starts by turning the driving on-switch on, and in accordance with the setting values on the magnetic card, feedback control is accomplished for flux gravity, preheating temperature, solder temperature and the conveyor speed and simultaneously the fan motors 20, 28, the heating wind heater 19, and the washer (not shown) are started ($S_{32}$). This main driving continues as long as the driving off-switch 43 is turned on, and if it is turned on, the system goes back to preparatory driving at $S_{26}$ ($S_{33}$).

Figure 8:
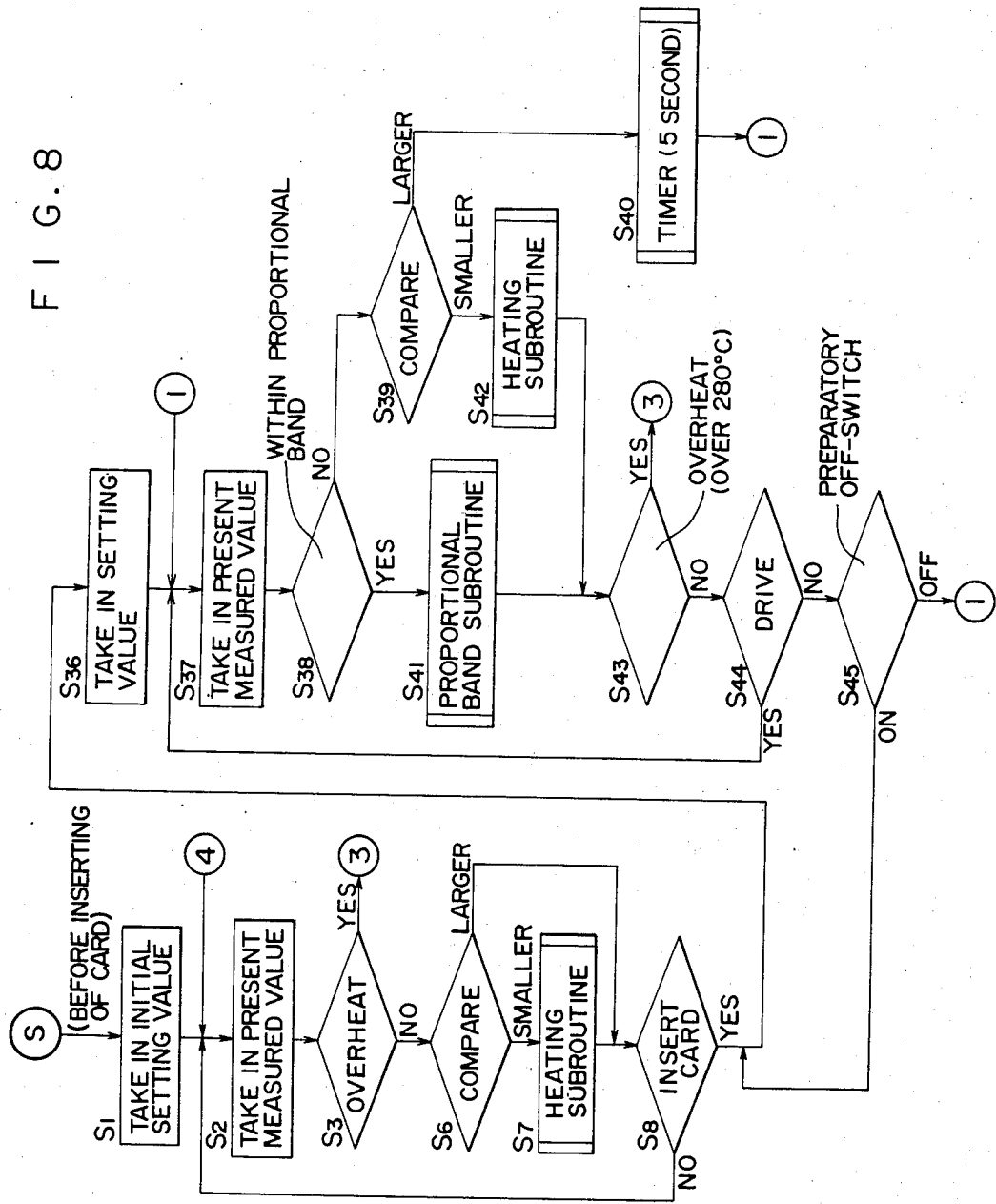
FIG. 8. is a flow chart showing a solder temperature controlling program.

FIG. 8 shows a flow chart of a solder temperature controlling program. The steps from $S_1$ to $S_8$ are the same as those of the program of the whole system so that the explanation thereof is omitted. When the solder temperature is over the initial setting value (200° C.) and thus the magnetic card 65 is inserted into the reader-writer 37, the solder temperature setting value of this card is taken in ($S_{36}$), the present solder temperature measured by the thermocouple 27 is taken in ($S_{37}$) and, comparing the setting value with the measured one, decision is made as to whether the difference between the setting value and the measured value is included in the proportional band or not ($S_{38}$). If said difference is over ±10° C., the comparison is accomplished ($S_{39}$). If the measured value is larger than the setting value, the timer gives an interval of, for example 5 seconds to the step without heating ($S_{40}$). The step goes back to $S_{37}$ and the steps from $S_{37}$ to $S_{40}$ are repeated. In the meantime, said difference is made to be within ±10° C. and the next proportional subroutine energizes the heater 22 so as to carry out heating ($S_{41}$). Further, if at $S_{39}$ the measured value is smaller than the setting value, the heating subroutine energizes the heater 22 ($S_{42}$). A decision is made as to whether the solder temperature is heated to more than 280° C. ($S_{43}$). If it is higher than 280° C. due to such causes as the failure of a switch or a couple, as shown in FIG. 7 (b), the overheating alarm is given. If it is not, a decision is made as to whether the driving on-switch 42 is turned on or off ($S_{44}$). If the driving on-switch 42 is turned on (during driving), the system goes back to $S_{37}$ and in $S_{37}$ to $S_{44}$, the main driving control is applied to the solder temperature. If the driving on-switch 42 is not turned on, the preparatory off-switch 41 is turned on or off ($S_{45}$). By turning this off-switch 41 on, the system goes back to $S_{36}$ where it is possible, for example, to amend the setting value. By turning said off-switch 41 off, the system goes back to $S_{37}$ and the preparatory driving of the solder temperature control continues.

Figure 9:
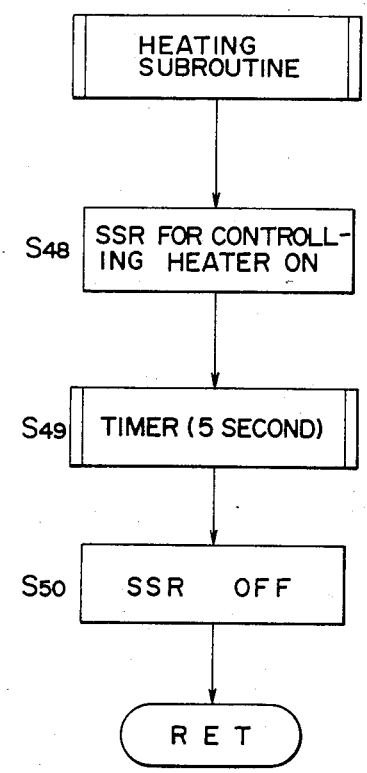
FIG. 9 is a flow chart showing a heating subroutine.

FIG. 9 shows a flow chart of the heating subroutine in FIG. 8. A solid state relay for controlling the temperature of the heater 21 or 22 (hereafter referred to as an SSR) is turned on ($S_{48}$) and, after the heater 21 or 22 has been on for, for example, 5 seconds ($S_{49}$), the SSR is turned off ($S_{50}$). Current should pass through the heater for a predetermined time to prevent chattering caused when the temperature reaches the setting value. If the current temporarily stops, when the measured value does not reach the setting value, heating by the 5-second-current is repeated immediately.

Figure 10:
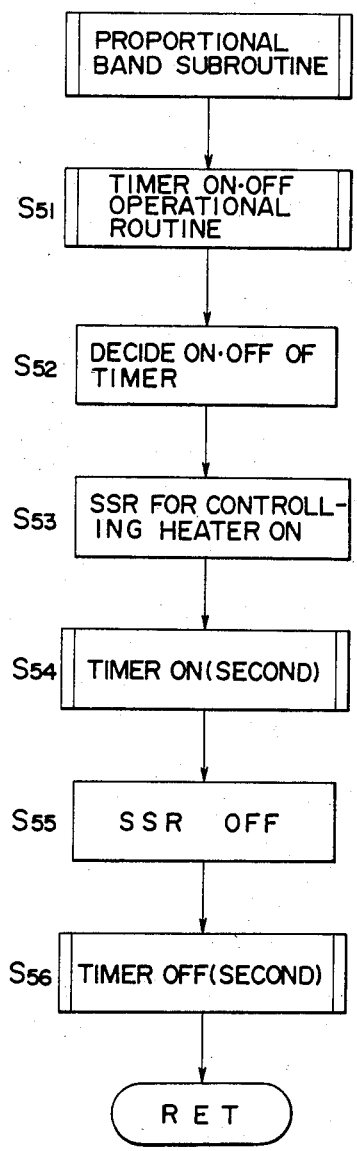
FIG. 10 is a flow chart showing a proportional band subroutine.

FIG. 10 shows a flow chart of the proportional band subroutine in FIG. 8. The timer-on-off operation routine $S_{51}$ decides the on-off time of the timer ($S_{52}$). The decision of this on-off time is made in accordance with the RAM data shown in the next table. For example, if the solder temperature has the same measured value as the setting value, for example, 250° C., current passes through the control heater 22 for 10 seconds in the on and off states. When the measured value is 249° C., the on time is 11 seconds and the off time is 9 seconds.

| Temperature difference of a measured value from the setting value (°C.) | | on time (seconds) | off time (seconds) |
|---|---|---|---|
| (measured value = 251° C.) | +9 | 1 | 19 |
| | +8 | 2 | 18 |
| (measured value = setting value = ° C.) | +7 | 3 | 17 |
| | +6 | 4 | 16 |
| (measured value = 249°C.) | +5 | 5 | 15 |
| | +4 | 6 | 14 |

-continued

| Temperature difference of a measured value from the setting value (°C.) | on time (seconds) | off time (seconds) |
|---|---|---|
| +3 | 7 | 13 |
| +2 | 8 | 12 |
| +1 | 9 | 11 |
| 0 | 10 | 10 |
| −1 | 11 | 9 |
| −2 | 12 | 8 |
| −3 | 13 | 7 |
| −4 | 14 | 6 |
| −5 | 15 | 5 |
| −6 | 16 | 4 |
| −7 | 17 | 3 |
| −8 | 18 | 2 |
| −9 | 19 | 1 |

As stated above, the on and off time are decided. For example, when the solder temperature measured vlaue is 249° C., the on state of the SSR for the control heater 22 ($S_{53}$) is maintained for 11 seconds by the timer ($S_{54}$) and the off state ($S_{55}$) of said SSR is maintained for 9 seconds by the timer ($S_{56}$).

Figure 11:
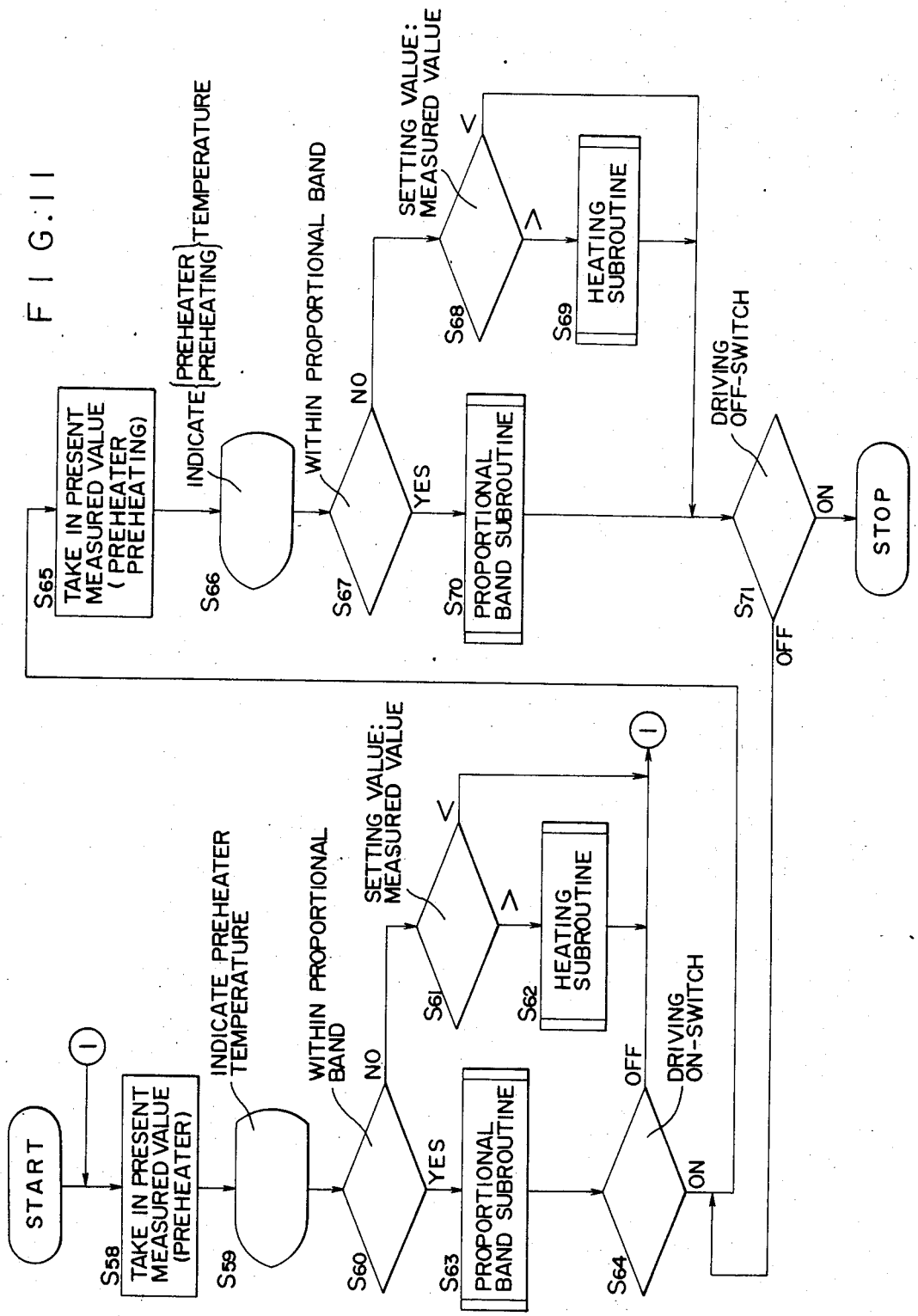
FIG. 11 is a flow chart showing a preheating temperature controlling program.

Next, FIG. 11 shows a flow chart of a control program for the preheating temperature. When the current starts to pass through the preheater 3 at, for example, 7:30 by means of the calendar timer, the present measured value of the atmospheric temperature of the preheater 3 (preheater temperature) is taken in by the thermocouple 31 ($S_{58}$). The CRT displays this preheater temperature ($S_{59}$) and compares the measured value with the setting value with respect to this preheater temperature in order to decide whether the difference thereof is within the proportional band or not ($S_{60}$). When said difference is not within the proportional band, the difference between the measured value and the setting value is is ±10° C., a decision is made as to which is larger, the setting value or the measured value ($S_{61}$). When the measured value is greater, steps $S_{58}$ to $S_{61}$ are repeated without heating (continuously stopping the heating). Further, when the measured value is less, the current is made to pass through the preheater 3 in accordance with the heating subroutine shown in FIG. 9 ($S_{62}$). When the steps $S_{58}$ to $S_{62}$ are repeated so as to continuously apply heat, the difference between the measured value and the setting value is, made to be within the proportional band (the difference is within ±10° C.), when the current is made to pass through the preheater 3 in accordance with the proportional band subroutine shown in FIG. 10 and said Table ($S_{63}$) and the main driving of the preheater 3 is continued so as to make the preheater temperature, only the atmospheric temperature, reach the setting value of the magnetic card. Next, until the driving on-switch is turned on, steps $S_{58}$ to $S_{63}$ are accomplished and, when it is turned on, the main driving, soldering driving, starts ($S_{64}$). In this main driving, the preheater atmospheric temperature, preheater temperature, is detected by means of the thermocouple 31, and the temperature on the lower side of the printed board P, that is, the heated side, is simultaneously detected by the infrared radiation thermometer 18, preheater temperature, without touching the surface, and both measured values of the preheater temperature and the preheating temperature are taken in ($S_{65}$). The CRT indicates both measured values ($S_{66}$). In the main driving, soldering driving, only the measured value of said preheating temperature, the printed board temperature, is compared with the setting value thereof, and a decision is then made as to whether the difference is within the proportional band ($S_{67}$). When said difference is not within the proportional band, over $\pm 10°$ C., a decision is made as to which is larger, the setting value or the measured value ($S_{68}$). When the setting value is larger, steps $S_{65}$ to $S_{68}$ are repeated without heating. When the meausred value is smaller, current is made to pass through the preheater 3 in accordance with the heating subroutine shown in FIG. 9 ($S_{69}$) and $S_{65}$ to $S_{69}$ are repeated. In the meantime, the difference between the measured value and the setting value is made to be within the proportional band, that is, the difference is made to be within $\pm 10°$ C., when current is made to pass through the preheater, which is controlled so as to maintain the preheating temperature, printed board temperature, as the setting value of the magnetic card, in accordance with the proportional band subroutine shown in FIG. 10 and said Table. This main driving control is continuously accomplished as long as the driving off-switch 43 is not turned on. When it is turned on, a decision is made to stop driving the preheater 3 ($S_{11}$).

Figure 12:
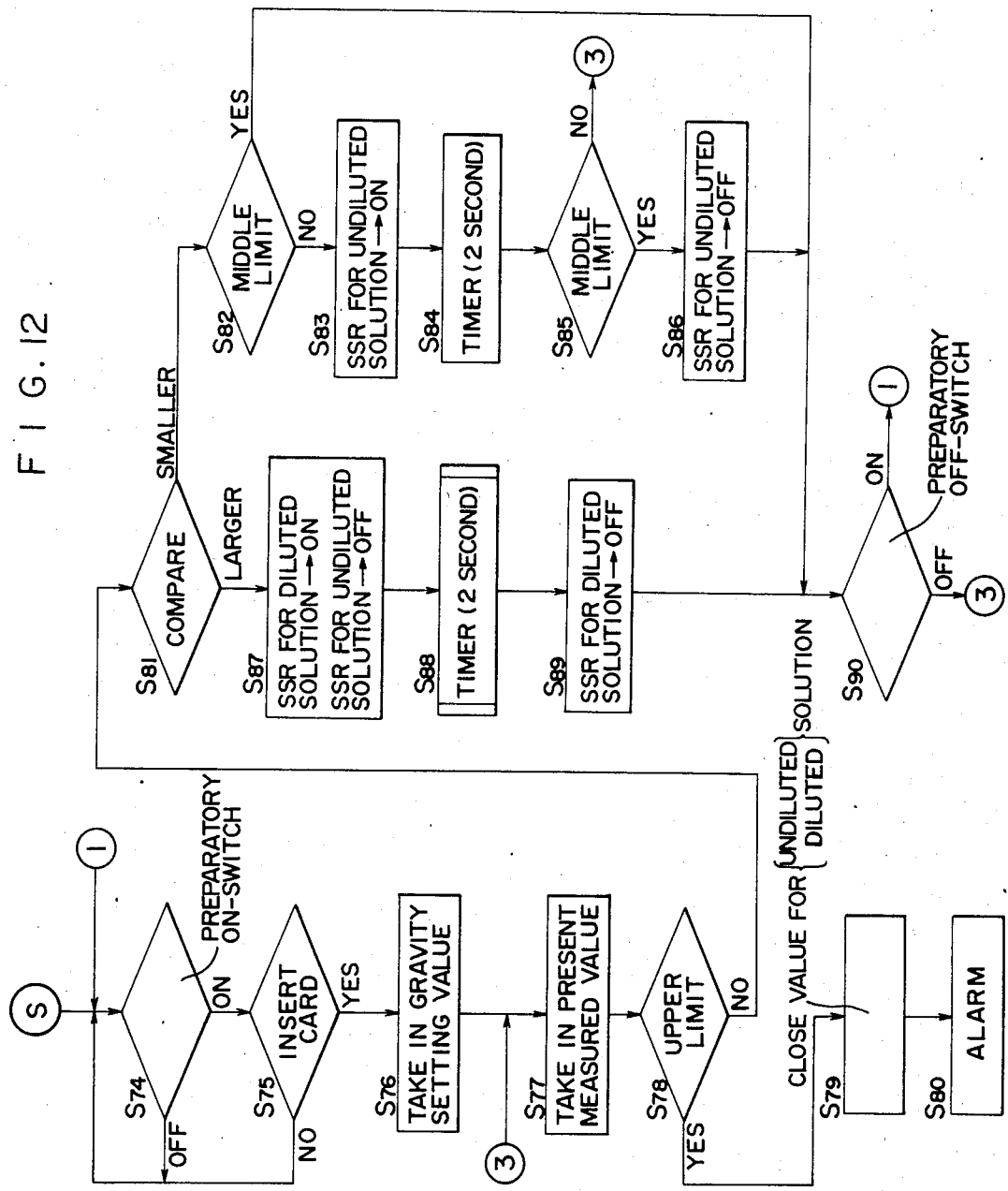
FIG. 12 is a flow chart showing a flux gravity controlling program.

Next, FIG. 12 shows a flow chart of a flux gravity control program. A decision is made as to whether the preparatory on-switch 40 is to be turned on ($S_{74}$). If it is to be turned on, a decision is made as to whether the magnetic card 65 is to be inserted or not ($S_{75}$). If it is not to be inserted, the decisions of $S_{74}$ and $S_{75}$ are repeated. If it is to be inserted, the setting value of the magnetic card is taken in ($S_{76}$) and the present measured value of the flux gravity is taken by the hydrometer 12 ($S_{77}$).

Figure 13:
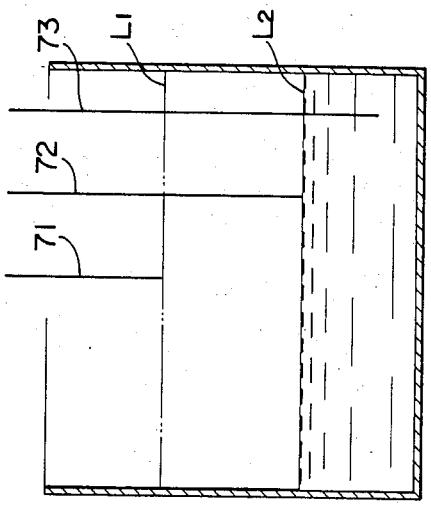
FIG. 13 is an explanatory view of a liquid-level indicator.

Next, a decision is made as to whether the flux surface has reached an upper limit level $L_1$ by means of an upper limit detecting index 71 of the liquid-level indicator 13 shown in FIG. 13 ($S_{78}$). If it has reached the level, the electromagnetic valves 16, 17 for the undiluted solution tank 14 and the diluted solution tank 15 are both closed ($S_{79}$) and the alarm is given ($S_{80}$) so as to operate an alarm lamp and a buzzer. Further, if the flux surface has not reached the upper limit level $L_1$, decision is made as to whether the measured value of the flux gravity is smaller than the setting value ($S_{81}$). If the measured value is smaller, a decision is made as to whether the flux surface has reached a middle limit level $L_2$ by means of middle limit needle 72 of the liquid-level indicator 13 ($S_{82}$). When it reaches the middle limit level $L_2$, the undiluted solution is not supplied and when it has not reached $L_2$, the solid state relay (SSR) for opening the electromagnetic valve 16 for the undiluted solution is turned on ($S_{83}$), so as to supply the undiluted solution for the time predetermined by the timer, for example, 2 seconds ($S_{84}$). A decision is made as to whether the flux surface has reached the middle level $L_2$ or not ($S_{85}$). Until it reaches $L_2$, $S_{77}$, $S_{83}$, $S_{84}$ and $S_{85}$ are repeated and, in the meantime, when it reaches the middle limit level $L_2$, the SSR for the undiluted solution is turned off ($S_{86}$). Returning to $S_{81}$, if the present measured value is larger than the setting value, the SSR for opening the electromagnetic valve 17 for the diluted solution is turned on and the SSR for the electromagnetic valve 16 for the undiluted solution is simultaneously turned off ($S_{87}$), so as to supply the diluted solution for the time predetermined by the timer, for example, 2 seconds ($S_{88}$). Then, said SSR for the diluted solution is turned off so as to stop the supply of the diluted solution ($S_{89}$). At the next step $S_{90}$, a decision is made as to whether the preparatory off-switch 41 is to be turned on or off. As long as this off-switch 41 is not turned on, the system goes back to $S_{77}$ and the control from steps $S_{77}$ and $S_{89}$ is repeated. When it is turned on, the system goes back to $S_{74}$, where insertion of the magnetic card permits set values to be changed. In addition, in FIG. 13, 73 denotes an grounding needle which is always inserted in the flux.

Figure 14:
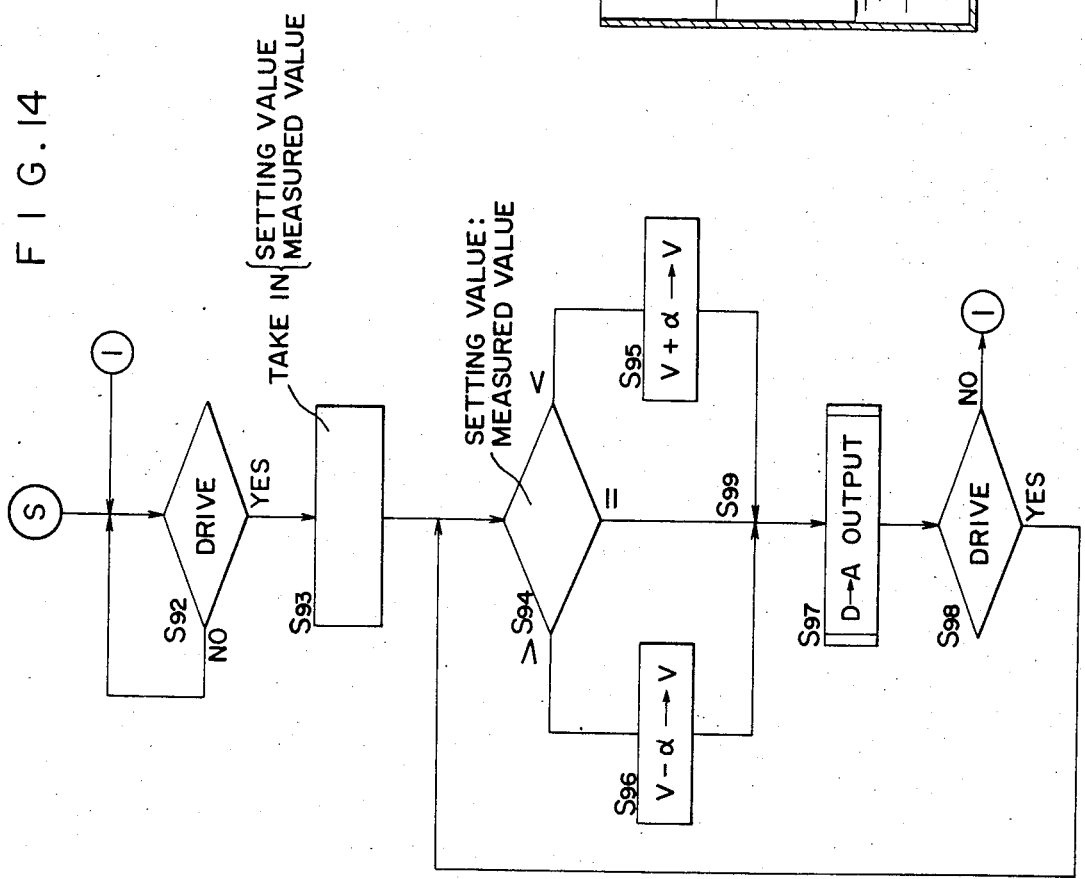
FIG. 14 is a flow chart showing a conveyor speed control program.

FIG. 14 shows a flow chart for a conveyor speed control program. When this program starts, a decision is made as to whether the conveyor is being driven (the state in $S_{32}$) or not ($S_{92}$). If it is being driven, the setting value of the magnetic card and the present measured value detected by the tachogenerator 30 are taken in ($S_{93}$). Comparing this setting value V with the measured value ($S_{94}$), the D/A converted output is sent to the conveyor motor (ring cone motor) 29 so as to, if the measured value is larger, decelerate $V+\alpha$ to V ($S_{95}$) and, if the measured value is smaller, accelerate $V-\alpha$ to V ($S_{96}$) and the system goes back to $S_{94}$ through $S_{98}$. These steps $S_{94}$, $S_{95}$ (or $S_{96}$), $S_{97}$ and $S_{98}$ are repeated. In the process of repetition, the measured value (the present conveyor speed) is made nearly equal to the setting value ($S_{99}$) and the control program continues. When this conveyor is stopped, the driving off-switch 43 is turned on, the system goes back to $S_{92}$. In this control program, for example, when the printed board is large, the conveyor speed is controlled so as to be a slower setting value to increase soldering time.

FIGS. 15, 16 and 17 show flow charts in which the time setting program per week of the calendar timer 58 in $S_{18}$ to $S_{20}$ shown in FIG. 7 is changed to the time setting program per month. As shown in FIG. 15, the timer setting per month of the solder heater is selected ($S_{101}$), when the CRT 35 displays the month and the date to be set ($S_{102}$) so that the on-time of the solder heater 21, 22 every on-and off-time in one day and the off-time of the heater 22 are set from the keyboard 34 ($S_{103}$). The set time is displayed on the CRT 35, whenever ($S_{104}$) the timer setting in an overall month is finished, and the program is terminated ($S_{105}$). Then, the system goes back to $S_9$.

Further, as shown in FIG. 16, when the timer setting per month of the preheater 3 is selected ($S_{106}$), the CRT indicates the month and the date to be set ($S_{107}$). Thus, the on-time and off-time of the preheater 3 at every on-and off-time in one day are set from the keyboard 34 ($S_{108}$). The set time is displayed on the CRT, at ($S_{109}$). When the timer setting in an overall month is finished, the program is terminated ($S_{110}$). Then the system goes back to $S_9$.

Moreover, as shown in FIG. 17, when the timer setting per month of the printer 36 is selected ($S_{111}$), the CRT 35 indicates the month and the date to be set ($S_{112}$) so that the on-time of the printer 36 is set from the keyboard 34 ($S_{113}$). The set time is displayed on the CRT, at ($S_{114}$). When the timer setting in an overall month is finished, the program is terminated ($S_{115}$). Then the system goes back to $S_9$. By virtue of the setting of the calendar timer, the flux gravity, the preheating temperature, the solder temperature and the conveyor speed are automatically recorded every 30 minutes, for example, by the printer.

Feedback control of the automatic soldering system in accordance with the setting values of the magnetic card 65 should not be limited to said 4 controlling means. For example, the setting value related to the conveyor's width corresponding to the size of the printed board is written in the magnetic card 65 in advance and, when the size of the printed board is changed, it is possible to automatically arrange the interval between a pair of transport chains of the conveyor 1 by exchanging said magnetic card. Specifically, the front and the rear of the conveyor frame supporting one side of the transport chain are made to shift in parallel in the width direction by means of ball screws which are constructed so as to synchronously rotate.

Figure 18:
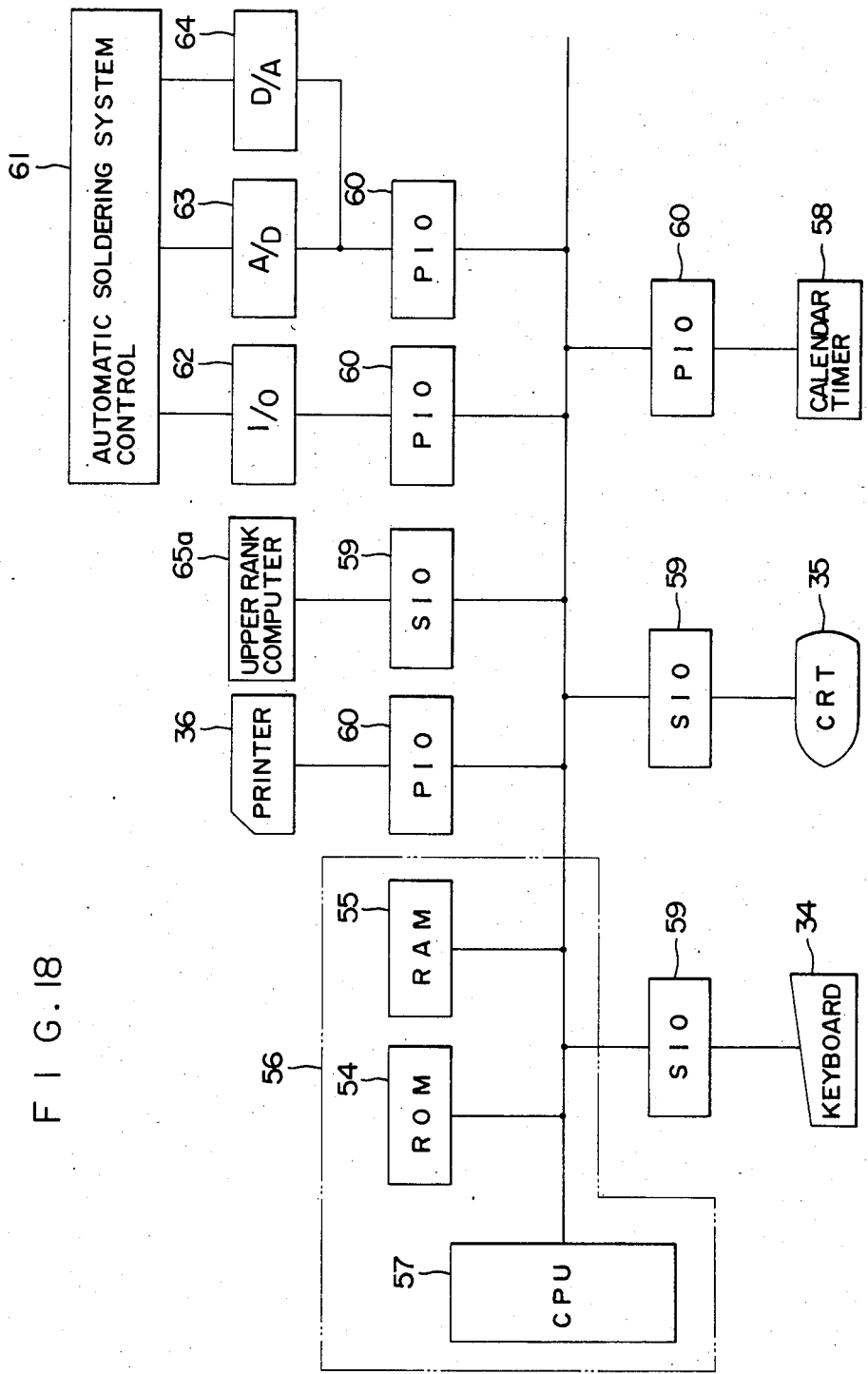
FIG. 18 is a block diagram showing a hardware arrangement of a system-controlling system in a host computer.

FIG. 18 is a block diagram showing the construction where the automatic soldering system is controlled by a host computer 65a in place of the control system employing said reader-writer 37 and magnetic card 65. The microcomputer 56 is connected to the host computer 65a through the SIO 59. This host computer 65a where various kinds of data are applied to conform to various tasks related to respective control means serves to supply the data to the RAM 55 of said microcomputer 56.

For example, with respect to a certain kind of printed board P, setting values such as the gravity value of flux, 0.830, the atmospheric temperature 150° C. of the preheater, hereafter referred to as the preheater temperature, molten solder temperature 250° C., and the conveyor speed, 1.2 m/min, are applied to said host computer 65a.

This host computer 65a controls the whole soldering system. For example, when it is necessary to change said data in relation to control means for reasons such as a difference in size of the printed board P, the density of concentration of the parts to be soldered on, this host computer 65a generates the amended data.

In the fluxer 2, the measured value by the flux gravity measuring means consisting of the hydrometer 12 and the liquid-level indicator 13 is A/D converted and then applied to the microcomputer 56, where the measured value is compared with the setting value supplied from said upper rank computer 65a and, in accordance with the difference between the setting value and the measured value, the microcomputer 56 generates on-off instructions to the electromagnetic valves 16, 17 functioning as flux gravity controlling means through the I/O.

In the preheater 3, the measured value of the preheater temperature measuring means consisting of the thermocouple 31 and the infrared radiation thermomenter 18 is A/D converted and then applied to the microcomputer 56, where the measured value is compared with the setting value supplied from the host computer 65a and, in accordance with the difference between the measured value and the setting value, the microcomputer 56 serves to apply the proportional control instruction to a heating wire functioning as a preheater temperature controlling means through the I/O.

In the solder bath 5, the measured value of the solder temperature measuring means consisting of the thermocouple 27 is A/D converted and is then applied to the microcomputer 56 where the measured value is compared with the setting value supplied from upper rank computer 65a and, in accordance with the difference between the measured value and the setting value, the miorocomputer applies the proportional control instruction to the control heater 22 functioning as solder temperature controlling means by way of the I/O. As a result, the solder temperature is controlled to 250° C. Further, the melting heater 21 is turned off when the solder temperature reaches 200° C. in accordance with the initial setting value written in the RAM 55.

In the conveyor 1, the measured value of the conveyor speed measuring means consisting of TG30 is A/D converted and is then applied to the microcomputer 56, where the measured value is compared with the setting value supplied from the upper rank computer 65a and, in accordance with the difference between the setting value and the measured one, the microcomputer 56 applies the auto-rater controlling instruction to the ring cone motor 29 functioning as the conveyor speed control through D/A conversion.

Moreover, when the printed board P is detected on each unit such as fluxer, solder bath and the like by means of a switch (not shown), the electromagnetic valve 8 on the air supply line to the firing cylinder 9 of the fluxer 2 is controlled from the closed state to the opening state. Consequently, the nozzle 11 fires the flux intermittently, and compressed air is supplied from said compressor 7 to the upper and the lower air knives 68 provided next to the fluxer 2 by opening the electromagnetic valve 69 so as to blow air on the printed board P to remove the surplus flux intermittently. Moreover, the rotation of the pump motor 24 in the solder bath 5 is immediately controlled from the low to the high speed so that the peak value of the melted solder fired from the nozzle 26 is switched from the low level to the high level intermittently. These intermittent functions are controlled by the microcomputer 56.

Figure 19:
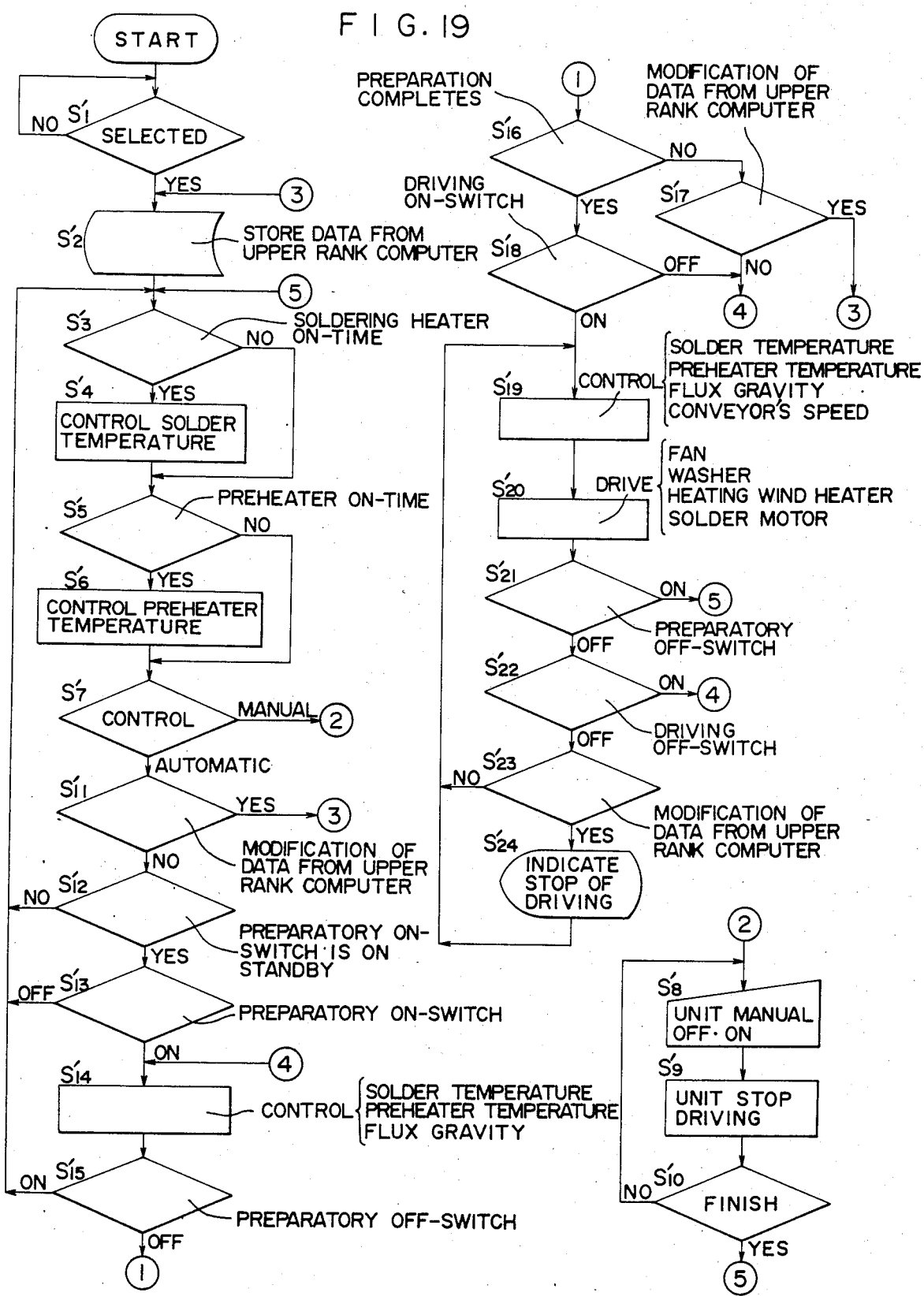
FIG. 19 is a flow chart showing the software program thereof.

The program for the host computer 65a for system-control is shown in the flow chart shown in FIG. 19. S'n shown in this Figure denotes each step of the flow chart.

When the program starts and the host computer 65a selects a microcomputer 56 (S'$_1$), the microcomputer 56 serves to read out the control data from the upper rank computer 65a and to store it in the RAM 55 (S'$_2$). Data such as the setting value of the solder temperature (250° C.), the setting value of the preheater temperature (150° C.), the setting value of the flux gravity, the setting value of the conveyor speed, and the data of the operating times of respective heaters 3, 21, 22 and the printer 36 are read out from the host computer 65a.

When the setting time comes (for example, at 6 : 30) (S'$_3$), current flows through the heaters 21, 22 so as to raise solder temperature to the setting value (250° C.) and the solder temperature control is effected (S'$_4$). Further, as to the preheater 3, when the setting time comes (S'$_5$), current flows through the heating wire 3a of the preheater 3 so as to raise the preheater temperature to the setting value (150° C.) and the preheater temperature control is effected (S'$_6$). These initial solder temperature control and preheater temperature controls are regarded as a first preparatory driving.

Under the above-stated first preparatory driving, manual control or automatic control is selected (S'$_7$).

When manual control is selected at this step S'$_7$, the CRT 35 displays the on-off type controlling means, control unit, such as ① preheater 3, ② solder motor 24, ③ fan motor 28, ④ conveyor motor 29, ⑤ heating wind fan motor 20 and heater 19, ⑥ washer (not shown). Thus during maintenance or the like, a selection of ① to ⑥ is made from the keyboard 34 if required or, by pushing the return key (on) to drive or a space key (off) to stop, the above-stated respective control means (control units) can be manually driven or stopped (S'$_9$) Pushing a final key makes the system go back to S'$_3$, otherwise S'$_8$, that is, selection of ① to ⑥ and the on or off selection (S'$_{10}$). In addition, the preheater 3 and the conveyor motor 29 are feedback controlled in the on state.

Returning to $S'_7$, when automatic control is selected, it is determined whether data sent from the upper rank computer 65a has been modified ($S'_{11}$) If it has been modified, the system goes back to $S'_2$, where new data sent from the host computer is stored and, in accordance with the new data, the solder temperature and the preheater temperature are controlled.

If said data sent from the host computer has not been modified, a decision is made as to whether the preparatory on-switch 40 can be on standby ($S'_{12}$). For example, at least a decision is made as to whether the solder temperature has reached 200° C. (YES) or not (NO) and if it has not, steps $S'_3$ to $S'_{12}$ are repeated. The step advances to $S'_{13}$ at the time when the solder temperature reaches to 200° C.

If at this $S'_{13}$ said preparatory on-switch 40 is not turned on, $S'_3$ to $S'_{13}$ are repeated. If the preparatory on-switch 40 is turned on, said solder temperature, said preheater temperature and the flux gravity are respectively feedback-controlled with the setting values read out from the upper rank computer as object values ($S'_{14}$) and the second preparatory driving is accomplished.

Next, if the preparatory off-switch 41 is turned on, the step goes back to $S'$, where only the solder temperature and the preheater temperature are controlled until the preparatory-on switch is turned off at $S'_{13}$. Further, if said preparatory off-switch 41 remains off, the step advances to $S'_{16}$, where a decision is made as to whether the preparation is complete. It means that a decision is made as to whether the solder temperature, the preheater temperature and the flux gravity have reached the setting values or not.

When preparation is not complete, it is determined whether the data sent from the host computer has been modified ($S'_{17}$). If the data has been modified, the system goes back to $S'_2$, where it is possible to re-accomplish the first preparatory driving. If the data has not been modified, the system goes back to $S'_{14}$, where the second preparatory driving continues.

Returning to $S'_{16}$, if preparation is complete, the main driving (soldering) starts by turning on the driving on-switch 42 ($S'_{18}$) and, in accordance with the setting values read out from the host computer, feedback control of the conveyor speed is carried out in addition to feedback control of the solder temperature and the preheater temperature ($S'_{19}$), when on-off control of the fan motors 20, 28, the washer (not shown), the heating wind fan 19 and the soldering motor 24 ($S'_{20}$) all start. The main driving can be continued as long as the preparatory off-switch 41 or the driving off-switch 43 is not turned on and the data sent from the host computer is not modified. If the preparatory off-switch is turned on ($S'_{21}$), the system goes back to the first preparatory driving at step $S'_3$. If the preparatory off-switch is turned on ($S'_{22}$), the system goes back to the second preparatory driving at step $S'_{14}$.

Furthermore, a check is made to determine whether data sent from the host computer has been modified ($S'_{23}$) and, if the data has been modified, the CRT 35 displays stopping driving ($S'_{24}$). This stopping does not mean the execution thereof, just the display. Since the system goes back to $S'_{19}$, pushing the preparatory off-switch at $S'_{21}$ makes the system go back to $S'_3$ and further go back to $S'_2$ by way of $S'_{11}$. At step $S'_2$, the data sent from the host computer is stored and control is accomplished on the basis of the modified data.

Further, the above-stated feedback control is not limited to said 4 controlling means. For example, the multiple data of the conveyor width corresponding to the size of the printed board are applied to the host computer 65a in advance, and when the size of the printed board is modified, it is possible to automatically arrange the interval between a pair of transportation chains of the conveyor 1 to conform with the modification of the data sent from the host computer. Concretely, the front and the rear parts of the conveyor frame supporting one side of the transportation chain are designed to shift in parallel in the lateral direction by means of ball screws or the like constructed to synchronously rotate.

According to the present invention, there are memorized on one magnetic card, in advance, at least a flux gravity setting value, a preheater temperature setting value, a solder temperature setting value and a speed setting value of the work conveyor, and in accordance with these setting values, the present measured values of the corresponding controlling means are designed to be detected by means of measuring means and to be comparison-controlled. Thus, for example, if the size of the work (printed board) is changed, the working conditions for respective controlling means of the automatic soldering system can be automatically changed so as to suit the new work by means of exchanging said magnetic card, and under optimal conditions to conform to the work, respective controlling means can be intensively and automatically controlled. Further, since this invention employs a full-key operation system where the respective on-off type controlling means can also be operated manually from a keyboard, it is unnecessary to carry out the on-off operation of the manual switch at every controlling means like the prior art systems so that the invention is more convenient than the prior art. Moreover, since the invention employs a response system between the keyboard and the display, it is possible to require each kind of information such as the working condition of the system and the like and to provide the required information. And erroneous operation can be prevented, because the program does not go ahead as long as the input information is not applied to the instructions of the operation process made through the display by means of the keyboard.

Furthermore, since the present invention includes the time-setting means for controlling a long-periodical program against respective controlling means, there is no need to effect complicated time-setting operations every day.

Moreover, since the invention includes recording and outputting means for automatically recording the working conditions of respective controlling means, it is possible to provide the data of the measured values of respective controlling means applied from this recording and outputting means for reference of maintenance and control of the automatic soldering system.

According to the present invention, it has the feature that the solder temperature controlling means is made to come into operation before inserting the magnetic card by virtue of the first preparatory driving and, by virtue of the second preparatory driving, the control amount by the flux gravity controlling means, the preheating temperature controlling means and the solder temperature controlling means is controlled so as to be the same as the setting values of the magnetic card corresponding with the work to be soldered, Accordingly, when at the start of working the driving on-switch is turned on, it is possible to immediately start the main driving (soldering driving) under optimal conditions for the work so that there is no meaningless waiting time.

The present invention also has the feature that when the solder temperature reaches the initial setting value, the automatic mode or the manual mode is selected and in the manual mode, the on-off type controlling means is made to be on-off-operated by means of the key-inputting means. Accordingly, under the state of dissolving solder by virtue of the first preparatory driving, it is possible to easily select and drive the on-off type controlling means such as a solder motor or the like by the input from a keyboard so that maintenance can be very easily carried out.

The present invention has a further feature that, in said manual mode, it is possible to rewrite the setting values of said magnetic card and select the precise setting of the operation time of said solder temperature controlling means and preheating temperature controlling means in addition to on-off-control of said on-off type controlling means by keyboard input. Accordingly, it is possible to change or modify these setting values or setting times immediately before starting the automatic driving of the soldering system and thus to make the automatic driving complete.

The present invention has a still further feature in that preparatory driving of the preheater has the function of measuring the atmospheric temperature of this preheater, and raising the temperature of the work to be soldered to around the setting value as comparing the measured value with the setting value of this atmospheric temperature and the soldering driving has the function of immediately measuring the temperature of the work to be soldered by means of the infrared radiation thermometer without touching the work so as to very accurately control the temperature of the work to be soldered to be the setting value. Accordingly, it is possible to hold the soldering characteristic in the next soldering step as the optimal value corresponding to the size of a work to be soldered.

The present invention has a still further feature that the on-and off-time of the preheater can be changed to conform to the temperature difference between the measured value and the setting value. Accordingly, when the temperature difference is large, it is possible to promptly make the measured value reach the setting value by virtue of enlarging the time difference between on-time and off-time and, when the temperature difference is small, it is possible to prevent a great increase of the measured value over the setting value by virtue of reducing the time difference.

The present invention has a still further feature that, when the temperature difference between the measured value and the setting value is within the proportional band area, the preheater is operated in accordance with the on-time and the off-time determined in conformity with the temperature difference and, when the temperature difference between said measured value and setting value is not within said proportional band area, the heating and the heating stop are continuously carried out. Accordingly, when said temperature difference is very large, it is possible to rapidly make this temperature difference be within the proportional band by virtue of said continuous control and thus to promptly carry out the temperature amendment of the work to be soldered.

The present invention has a still further feature that, on the basis of the setting values sent from the host computer, driving is started serially from the controlling means requring more time for the preparatory driving to that requiring less time therefor. Accordingly, at the start of working, it is possible to immediately start the main driving (soldering driving) under the optimal conditions for the work and thus there is no meaningless waiting time. Further, since the present invention is designed to obtain the working setting values for respective controlling means from the upper rank computer, it is possible to easily amend the setting values when necessary and to easily conform with the change of the work or the like.

The present invention has another feature that in the first preparatory driving, automatic control or manual control is selected and in the manual control, the on-off type control means is made to be on-off-operated by means of the key-input means. Accordingly, under the state of dissolving solder in said first preparatory driving, it is possible to select an on-off control such as a soldering motor or the like by input from a keyboard and then to drive it. As a result, maintenance can be easily carried out.

We claim:

1. An apparatus for controlling an automatic soldering system comprising a magnetic card recording at least a flux gravity setting value, a preheating temperature setting value, a solder temperature setting value and the work conveyor speed setting value, card-reading-and-writing means for reading out and writing said setting values recorded in said magnetic card, control means such as at least flux gravity control means, preheating temperature control means, solder temperature control means and work conveyor speed control means in an automatic soldering system controlled on the basis of respective setting values read out from said card-reading-and writing means, measuring means for measuring control amounts of respective control means, comparing means for comparing measured values of respective control means with the setting values of said magnetic card and supplying control inputs to respective control means, key-input means for writing respective setting values on said magnetic card by way of said card-reading-and-writing means, on-off type control means which can be on-off-operated by said key-input means and a display means for displaying the working conditions of said key-input means, said card-reading-conditions and-writing means and respective control means.

2. An apparatus for controlling an automatic soldering system comprising a magnetic card recording at least a flux gravity setting value, a preheating temperature setting value, a solder temperature setting value and a work conveyor speed setting value, card-reading-and-writing means for reading out and writing said setting values recorded in said magnetic card, control means such as at least flux gravity control means, preheating temperature control means, solder temperature controlling means and work conveyor speed control means in an automatic soldering system controlled on the basis of said respective setting values read out from said card-reading-and-writing means, measuring means for measuring control amounts of said respective control means, comparing means for comparing measured values of said measuring means with the setting values of said magnetic card and supplying control inputs to said respective control means, keyboard input means for writing respective setting values on said magneiic card by way of said card-reading-and-writing means, on-off type control means which can be on-off-operated by said keyboard input means, display means for displaying the working conditions of said keyboard input means, said card-reading-and-writing means and said respective control means, and time-setting means for controlling a set over a long period of time program for said respective control means in accordance with the set time by said keyboard input means.

3. An apparatus for controlling an automatic soldering system comprising a magnetic card recording at least a flux gravity setting value, a preheating temperature setting value, a solder temperature setting value and a work conveyor speed setting value, card-reading-and-writing means for reading out and writing said setting values recorded in said magnetic card, control means such as at least flux gravity control means, preheating temperature control means, solder temperature control means and work conveyor speed control means in the automatic soldering system controlled on the basis of said respective setting values read out from said card-reading-and-writing means, measuring means for measuring control amounts of said respective control means, comparing means for comparing measured values of said measuring means with the setting values of said magnetic card and supplying control inputs to said respective control means, keyboard input means for writing respective setting value on said magnetic card by way of said card-reading-and-writing means, on-off control means which can be turned on and off operated by said keyboard input means, display means to display the working conditions of said keyboard input means, said card-reading-and-writing means and said respective control means, time-setting means for controlling a set over a long period of time program for said respective control means in accordance with the set time by said keyboard input means, and recording and output means for automatically and periodically recording the working conditions of respective control means in accordance with the instructions of said time-setting means.

4. A method of controlling a soldering system comprising the steps of; starting a first preparatory driving of solder temperature control means by starting to drive said means at a set time and simultaneously taking in an initial setting value of a solder temperature stored in a computer and a measured value detected by measuring means, inserting in card-reading-and-writing means a magnetic card recording setting values of working conditions of at least flux gravity control means, preheating temperature control means and solder temperature control means for the purpose of reading out said respective setting values when the solder temperature attains the initial setting value, starting a second preparatory driving of said respective control means on the basis of said respective setting values, and starting a main drive on the condition that the setting values in compliance with said respective control means are satisfied at the time of turning a driving on-switch on.

5. A method of controlling a soldering system comprising the steps of; starting a first preparatory driving of solder temperature control means by starting to drive said means at a set time and simultaneously taking in an initial setting value of a solder temperature stored in a computer and a measured value detected by measuring means, selecting an automatic mode or a manual mode when the solder temperature attains the initial setting value, in the automatic mode, inserting in card-reading-and-writing means a magnetic card recording setting values of working condtions of at least flux gravity control means, preheating temperature control means and solder temperature control means for the purpose of reading out said respective setting values, starting a second preparatory driving of said respective control means on the basis of said respective setting values, starting main driving on the condition that the setting values in compliance with said respective control means are satisfied at the time of turning a driving on-switch on, and in the manual mode, on-off-operating on-off type controlling means by means of keyboard input.

6. A method of controlling a soldering system comprising the steps of; starting a first preparatory driving of solder temperature control means by starting to drive said means at a set time and simultaneously taking in an initial setting value of a solder temperature stored in a computer and a measured value detected by measuring means, selecting an automatic mode or a manual mode when the solder temperature attains the initial setting value, in the automatic mode, inserting in card-reading-and-writing means a magnetic card recording setting values of working conditions of at least flux gravity control means, preheating temperature control means and solder temperature control means for the purpose of reading out said respective setting values, starting a second preparatory driving of said respective control means on the basis of said respective setting values, starting a main driving on the condition that the setting values in compliance with said respective control means are satisfied at the time of turning a driving on-switch on, and in the manual mode, selection on/off-operating of on-off type control means by means of keyboard input means, writing of the setting values in said magnetic card and the setings of the operation times of said solder temperature control means and preheating temperature control means.

7. A method of controlling a preheating temperature in soldering comprising the steps of; taking in a measured value of an atmospheric temperature of a preheater for preheating a work to be soldered, comparing the measured value with a setting value in relation to the atmospheric temperature, continuing preparatory driving of the preheater until this atmospheric temperature attains the setting value, starting soldering driving after said atmospheric temperature attains the setting value, measuring a temperature of the work to be soldered by means of an infrared radiation thermometer, comparing the measured value with the setting value in relation to the temperature of the work to be soldered and controlling the temperature of the work to be soldered to the setting value.

8. A method of controlling a preheating temperature in soldering comprising the steps of; taking in a measured value of an atmospheric temperature of a preheater for preheating a work to be soldered, comparing the measured value with a setting value in relation to the atmospheric temperature, continuing preparatory driving of the preheater until this atmospheric temperature attains the setting value, starting a soldering driving after said atmospheric temperature attains the setting value, measuring a temperature of the work to be soldered by means of an infrared radiation thermometer, comparing the measured value with the setting value in relation to the temperature of the work to be soldered, controlling the temperature of the work to be soldered to the setting value, and in said preparatory driving and soldering driving, operating the preheater in accordance with the on-time and off-time determined on the basis of the temperature difference between the measured value and the setting value.

9. A method of controlling a preheating temperature in soldering comprising the steps of; taking in a measured value of an atmospheric temperature of a preheater for preheating a work to be soldered, comparing the measured value with a setting value in relation to the atmospheric temperature, continuing preparatory driving of the preheater until this atmospheric temperature attains the setting value, starting a soldering driving after said atmospheric temperature attain the setting value, measuring the temperature of the work to be soldered by means of an infrared radiation thermometer, comparing the measured value with the setting value in relation to the temperature of the work to be soldered, controlling the temperature of the work to be soldered to the setting value, and in said preparatory driving and soldering driving, when the temperature difference between the measured value and the setting value is within a proportional band, operating the preheater in accordance with the on-time and off-time determined on the basis of the temperature difference, when said temperature difference between the measured value and the setting value is not within the proportional band, continuously accomplishing heating or heating stop until said difference enters into the proportional band.

10. In an automatic soldering system where soldering is carried out as transporting a work to be soldered along a fluxer, a preheater and a solder bath by means of a conveyor, a method for controlling said automatic soldering system comprising the steps of; starting a first preparatory driving by starting to drive solder temperature control means and preheater temperature control means at a set time, on the condition that the solder temperature attains a predetermined temperature, starting a second preparatory driving in which flux gravity control means in addition to said solder temperature control means and said preheater temperature control means are respectively worked on the basis of setting values read out from a host computer, and on the condition that said respective control means satisfy their corresponding setting values, starting a main driving in which at least conveyor speed control means in addition to said solder temperature control means, said preheater temperature control means and said flux gravity control means are respectively worked on the basis of setting values read out from the host computer.

11. In an automatic soldering system where soldering is carried out as transporting a work to be soldered along a fluxer, a preheater and a solder bath by means of a conveyor, a method for controlling said automatic soldering system comprising the steps of; starting a first preparatory driving by starting to drive solder temperature control means and preheater temperature control means at a set time, in this first preparatory driving, an automatic control or a manual control being selected, in the automatic control, on the condition that the solder temperature attains a predetermined temperature, starting a second preparatory driving in which flux gravity control means in addition to said solder temperature control means and said preheater temperature control means are respectively worked on the basis of setting values read out from an upper rank computer, on the condition that said respective control means satisfy their corresponding setting values, starting a main driving in which at least conveyor speed control means in addition to said solder temperature control means, said preheater temperature control means and said flux gravity control means are respectively worked on the basis of setting values read out from the upper rank computer, and in said manual control, on off-operating on-off type oontrol means by means of keyboard input.

* * * * *